United States Patent [19]

Kalach et al.

[11] 3,966,877

[45] June 29, 1976

[54] METHOD OF PROCESSING OF WASTE GASES

[76] Inventors: Vladimir Sergeevich Kalach, ulitsa Lobachevskogo, 22, kv. 37; Lidia Ivanovna Burlakova, Leninsky prospekt, 52, kv. 316, both of Moscow, U.S.S.R.

[22] Filed: Sept. 11, 1974

[21] Appl. No.: 505,082

[52] U.S. Cl. ............................... 423/240; 423/470; 423/341; 423/339; 423/490
[51] Int. Cl.² ......................................... B01D 53/34
[58] Field of Search ........... 423/240, 241, 484, 470, 423/471, 341, 490, 489, 335, 339

[56] References Cited
UNITED STATES PATENTS

| | | | |
|---|---|---|---|
| 3,024,086 | 3/1962 | Cines | 423/490 |
| 3,859,423 | 1/1975 | Hartig | 423/490 |

*Primary Examiner*—Earl C. Thomas
*Attorney, Agent, or Firm*—Steinberg and Blake

[57] ABSTRACT

A method of processing of waste gases containing hydrogen fluoride and silicon tetrafluoride or hydrogen fluoride, silicon tetrafluoride and sulfur dioxide by absorption of hydrogen fluoride and silicon tetrafluoride or hydrogen fluoride, silicon tetrafluoride and sulfur dioxide from waste gases by water solutions containing ammonium compounds such as ammonium carbonate, ammonium bicarbonate and ammonium fluoride. In addition to these ammonium compounds the absorption solutions contain sodium fluoride and ammonia. The absorption process produces a water solution containing ammonium fluoride and the precipitate of sodium fluosilicate. This solution is treated with sodium carbonate after which the precipitate of sodium fluoride is separated from the solution and the latter is delivered for absorption.

8 Claims, 1 Drawing Figure

U.S. Patent   June 29, 1976   3,966,877
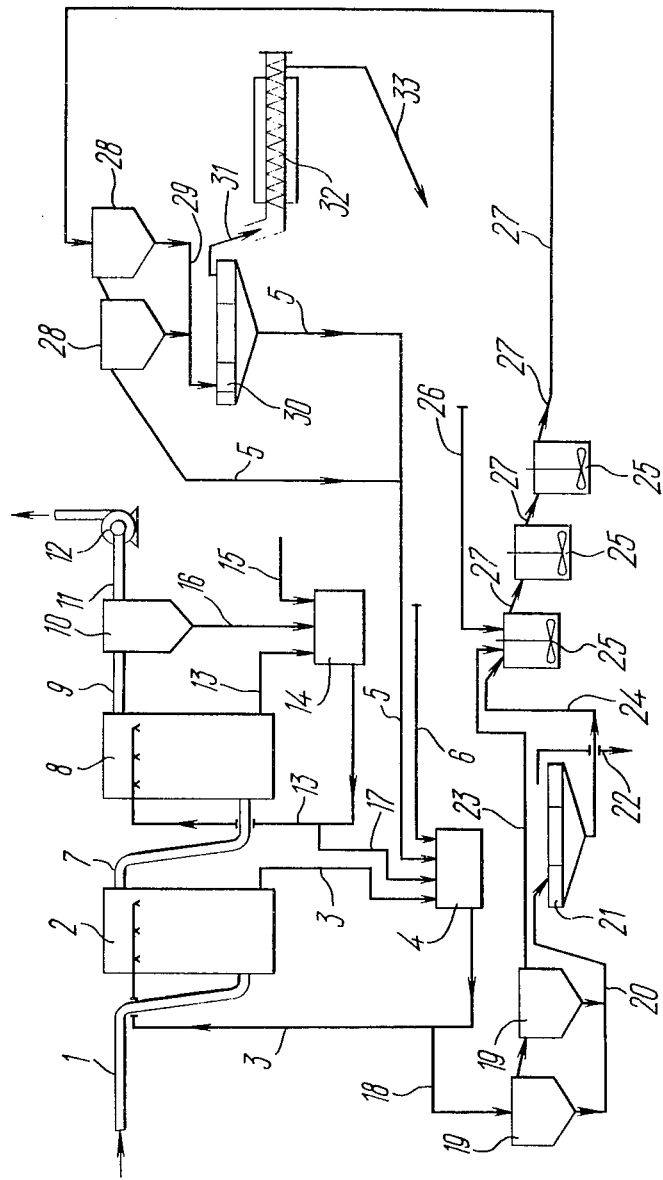

METHOD OF PROCESSING OF WASTE GASES

The present invention relates to the method of processing of waste gases in which hydrogen fluoride is an obligatory component.

This method can be utilized in processing the waste gases liberated in the production of defluorinated fodder phosphates obtained by hydrothermal decomposition of phosphate ores. In addition to hydrogen fluoride these waste gases contain small proportions of silicon tetrafluoride and phosphate ore dust which cannot be trapped by special dust collectors.

This method can also be utilized is processing waste gases liberated in the production of double superphosphate and in inspissation of extraction phosphoric acid. In addition to hydrogen fluoride said waste gases contain silicon tetrafluoride and phosphoric acid mist.

In addition, the method according to the invention is utilized in processing waste gases in the aluminum industry, said gases containing equal parts of hydrogen fluoride and sulfur-bearing gas (sulfur dioxide) with a small admixture of silicon tetrafluoride, and dust particles of cryolite, sodium fluoride and alumina.

The method can also be used, in particular, for processing of waste gases in the production of concentrated hydrofluoric acid, which contain hydrogen fluoride and silicon tetrafluoride.

Known in the prior art is a method of processing of waste gases containing hydrogen fluoride and silicon tetrafluoride (U.S. Pat. No. 3,238,017). In addition to from the components mentioned above, the waste gases may contain sulfur dioxide.

The method consists in absorbing hydrogen fluoride and silicon tetrafluoride from waste gases by water solutions containing ammonium compounds (ammonium sulfate, ammonium chloride and ammonium nitrate) and salts (sodium sulfate, sodium chloride, sodium nitrate, potassium sulfate, potassium chloride and potassium nitrate).

The process of absorption produces an acid solution containing ammonium bifluoride and the precipitate of potassium fluosilicate in accordance with the following reactions:

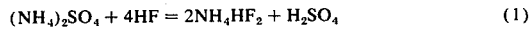

$$(NH_4)_2SO_4 + 4HF = 2NH_4HF_2 + H_2SO_4 \qquad (1)$$

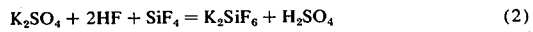

$$K_2SO_4 + 2HF + SiF_4 = K_2SiF_6 + H_2SO_4 \qquad (2)$$

The precipitate of potassium fluosilicate is separated from the solution and removed. The acid solution is treated with sodium fluoride to produce sodium bifluoride which precipitates according to the reaction:

$$NH_4HF_2 + NaF = NaHF_2 + NH_4F \qquad (3)$$

Sodium bifluoride is separated, dried and decomposed at a temperature above 300°C into sodium fluoride and hydrogen fluoride according to the reaction:

$$NaHF_2 \xrightarrow{t°} NaF + HF \qquad (4)$$

The obtained sodium fluoride is returned into the process for precipitating sodium bifluoride from the acid solution. Hydrogen fluoride constitutes the commercial product of this method. A disadvantage of the above-described method consists in the complexity of the technological process since all stages of processing waste gases take place in an acid medium because the absorption solution contains a hard-to-separate mixture of diluted solutions of hydrofluoric and sulfuric acids. This results inevitably in heavy corrosion of the processing equipment. Besides, this process yields sewage waters.

An object of the present invention is to provide a method of processing of waste gases which would allow all stages of the technological process to be carried out in a practically neutral or alkaline medium.

Another object of the present invention is to provide a method of processing of waste gases which would dispense with the discharge of sewage waters into the sewer system.

Still another object of the invention is to provide an economical method of processing of waste gases which would yield pure sodium fluoride as a commercial product.

In accordance with these and other objects the present invention consists in processing of waste gases which contain hydrogen fluoride and silicon tetrafluoride or hydrogen fluoride, silicon tetrafluoride and sulfur dioxide by absorption of hydrogen fluoride and silicon tetrafluoride or hydrogen fluoride, silicon tetrafluoride and sulfur dioxide from said waste gases by water solutions containing ammonium compounds wherein, according to the invention, absorption is carried out with the aid of water solutions containing ammonium compounds (ammonium carbonate, ammonium bicarbonate and ammonium fluoride) and ammonia and sodium fluoride; this process of absorption produces a water solution containing ammonium fluoride and a precipitate of sodium fluosilicate; this solution is treated with sodium carbonate after which the precipitate of sodium fluoride is separated from the solution and the latter is delivered for absorption.

It is recommended that the proportion by weight in the absorption solution of sodium fluoride with ammonium compounds and ammonia should be 1 : 1.

It is practical to separate the precipitate of sodium fluosilicate from the water solution containing ammonium fluoride, before said solution is treated with sodium carbonate. However, the precipitate of sodium fluosilicate may not be separated from the solution.

Before the water solution containing ammonium fluoride is treated with sodium carbonate it is possible to treat the precipitate of sodium fluosilicate with ammonia and to separate the produced precipitate of silicon dioxide from said solution containing ammonium fluoride.

An advantage of the method according to the invention consists in producing a valuable product — sodium fluoride — from waste gases. The technological process is based on a no-sewage layout with preliminary removal of such insoluble admixtures as sodium fluosilicate and phosphate dust. Besides, absorption of hydrogen fluoride and silicon tetrafluoride is carried out in a neutral of alkaline medium which increases the degree of absorption of gaseous fluoride compounds and lower corrosion of the equipment.

The method of processing of waste gases according to the invention will now be described in detail with reference to the drawing which illustrates the technological layout of the process. According to the drawing, the waste gas containing hydrogen fluoride and silicon tetrafluoride as well as such unwanted admixtures as phosphate ore dust, cryolite or alumina dust, sulfur-bearing gas (sulfur dioxide) or phosphoric acid mist flows through gas pipe 1 into the 1st stage absorption apparatus 2 which is sprinkled with a water solution circulating through pipeline 3 and delivered from the 1st stage circulation tank. Said water solution fed into the absorption apparatus contains sodium fluoride within its solubility limits, ammonium compounds ammonium carbonate, ammonium bicarbonate), ammonia and ammonium fluoride.

In the course of absorption, ammonium carbonate, ammonium bicarbonate and ammonia interact with gaseous hydrogen fluoride and form ammonium fluoride which readily dissolves in water; this proceeds according to the following reactions:

$$2HF + (NH_4)_2CO_3 = 2NH_4F + CO_2 + H_2O \qquad (5)$$

$$HF + NH_4HCO_3 = NH_4F + CO_2 + H_2O \qquad (6)$$

$$HF + NH_3 = NH_4F \qquad (7)$$

If the waste gases to be processed contain sulfur dioxide, in addition to hydrogen fluoride and silicon tetrafluoride, the process of absorption produces mono-substituted ammonium sulfite according to the reaction:

$$SO_2 + (NH_4)_2CO_3 = NH_4HSO_3 + CO_2 + NH_3 \qquad (8)$$

Simultaneously, the sodium fluoride contained in the absorption solution interacts with silicon tetrafluoride which is delivered with the gas flow, and forms the precipitate of sodium fluosilicate according to the reaction:

$$SiF_4 + 2NaF = Na_2SiF_6 \qquad (9)$$

A small excess of ammonium compounds in the absorption solution produces a neutral of alkaline medium wherein the phosphate ore dust and other solid particles entrained by the gas flow are not dissolved and precipitate together with sodium fluosilicate. The pH, value of the circulating absorption solution may vary from 5.0 (slightly acid) to 9.0 (slightly alkaline). However, the most acceptable pH is in the natural range of from 6.5 to 7.5. These predetermined parameters are maintained by continuous or intermittent supply into the 1st stage circulation tank 4 of a water solution containing amonium compounds and sodium fluoride through a pipeline 5; sometimes it is sufficient to supply a water solution of ammonia delivered through a pipeline 6.

After the major proportion of fluoride compounds has been absorbed in the 1st stage absorption apparatus 2 the gas moves through a gas pipe 7 for secondary cleaning (to meet sanitary requirements) in the second stage absorption apparatus 8 from which it moves through a gas pipe 9 into a spray separator 10. From the spray separator 10 the gas is discharged into the atmosphere through a gas pipe 11 and a fan 12. The second stage absorption apparatus 8 is also sprinkled with absorption solution which circulates through a pipeline 13 and delivered from the second stage circulation tank 14. The process of absorption of hydrogen fluoride and silicon tetrafluoride from waste gases is accompanied by partial evaporation of water and by discharge of vapours into the atmosphere together with the purified gases through the fan 12; therefore, the second stage circulation tank 14 is supplied with clean water through a pipe 15 to make up for the water losses at all the stages of the technological process. Simultaneously, the same tank 14 is supplied through a pipe 16 with liquid from the spray separator 10. A part of the solution is pumped from the tank 14 through a pipe 17 into the first stage circulation tank 4. A part of the circulating absorption solution is, in turn, taken from the first circulation tank 4 and delivered through a pipe 18 into tandem-connected settlers 19 for settling the suspended particles of sodium fluosilicate, phosphate dust and other insoluble admixtures.

The settling rate of these particles ranges from 0.1 to 0.3 m/hr. The sludge with a solid-to-liquid phase ratio of 1 : 10 is delivered through a pipe 20 to a vacuum filter 21 from which the filtered sludge is discharged from the process through a line 22. The sodium fluosilicate removed from the process can be used as a commercial product.

The clarified solution containing ammonium fluoride is delivered from the settlers 19 through a pipe 23 and the filtrate is delivered through a pipe 24 into the first one of the three successively located reaction vessels 25 with agitators. Simultaneously, sodium carbonate (soda ash) is delivered through a line 26 into the first reaction vessel 25. The other two reaction vessels 25 are designed to adjust the predetermined relation of source components (ammonium fluoride and sodium carbonate) and to stir the reaction material. The amount of delivered sodium carbonate is smaller than that of ammonium fluoride, constituting 80 ± 10% of the amount determined by calculations.

Interaction of soda ash with the clarified solution containing ammonium fluoride and the unreacted part of sodium fluoride, ammonium carbonate and bicarbonate, and ammonia produces sodium fluoride and ammonium carbonate according to the reaction:

$$2NH_4F + Na_2CO_3 = 2NaF + (NH_4)_2CO_3 \qquad (10)$$

It must be noted that the produced ammonium carbonate is hydrolyzed to a considerable extent and produces ammonium bicarbonate and ammonia according to equations:

$$(NH_4)_2CO_3 + H_2O \rightleftarrows NH_4HCO_3 + NH_4OH \qquad (11)$$

$$NH_4HCO_3 \rightleftarrows NH_4OH + CO_2 \qquad (12)$$

$$NH_4OH \rightleftarrows NH_3 + H_2O \qquad (13)$$

Nevertheless, to simplify calculations, the materials required for the technological process are expressed in terms of ammonium carbonate only.

It can be seen from equations 11 – 13 that considerable concentrations of ammonium carbonate will cause losses of ammonia into the atmosphere, therefore concentration of ammonium carbonate in absorption solutions is limited to 3 – 5%. It has been mentioned above that ammonia losses are made up for by delivering an aqueous solution of ammonia through the pipe 6 into the 1st stage circulation tank 4.

If the waste gas contains sulfur dioxide, the mono-substituted ammonium sulfite is transformed into sodium sulfite.

Solubility of sodium fluoride in water is not over 4.2 wt.-% while in said industrial solutions it does not exceed 3.0 – 3.5 wt.-% so that the major part of sodium fluoride produced according to the reaction (10) precipitates.

If the waste gases contain sulfur dioxide in addition to hydrogen fluoride and silicon tetrafluoride, the main proportion of sodium sulfite contained in the absorption solution precipitates together with sodium fluoride.

The suspension of sodium fluoride is fed from the reaction vessels 25 through a pipe 27 into the tandem-arranged settlers 28 to thicken the precipitate until the solid-to-liquid phase ratio reaches 1 : 3. The thickened mass is delivered through a pipe 29 to a vacuum filter 30.

The clarified solution and the filtrate saturated with sodium fluoride and containing ammonium compounds in the form of a mixture of ammonium carbonate and bicarbonate and ammonia are delivered, respectively, from the settlers 28 and vacuum filter 30 through the pipe 5 into the 1st stage circulation tank 4 from which they can be used again for absorption of hydrogen fluoride and silicon tetrafluoride from waste gases.

The filtered precipitate of sodium fluoride is delivered through a line 31 into a drying oven 32 from which it is discharged through a line 33, packed and delivered to the consumers as a commercial product.

If the precipitate contains sodium sulfite, said precipitate is washed with hot water before entering the oven after which the washing water is removed from the process.

The above description of the technological layout should be supplemented by pointing out that the precipitate delivered from the vacuum filter 21 and containing sodium fluosilicate, phosphate dust and other admixtures is processed by various embodiments of the method, whose selection depends on the composition of said precipitate. For example, the precipitate with a greater amount of phosphate ore dust should be mixed with the source phosphate material delivered for processing. In the second version of the method of processing, when the waste gas contains a small amount of dust and admixture of silicon tetrafluoride (not exceeding 5 wt.-% of the total amount of fluorine) and the commercial product — sodium fluoride — must not meet high-quality requirements, then the solution from tank 4 is directly delivered to reaction vessels 27. In this case the process and the technological layout are simplified considerably by canceling the process of settling in the settlers 19 and filtering in the vacuum filter 21. This version of the method is applicable for processing waste gases in the aluminium industry.

The third version of the method is used when the waste gases contain, in addition to hydrogen fluoride, a considerable amount (5 – 40 wt.-% of the total amount of fluoride) of silicon tetrafluoride and when it is uneconomical to remove the precipitate of sodium fluosilicate together with dust without processing. However, this method calls for additional equipment and an additional stage of the process. As we have noted above, the sodium fluosilicate is precipitated (reaction 9) and dust is collected in the 1st stage absorption apparatus 2 and the absorption solution together with the suspended particles is delivered into a special reaction vessel (not shown in the drawing) where it is treated with, say, gaseous ammonia, mixed constantly for an hour.

This produces sodium fluoride, ammonium fluoride and a precipitate of silicon dioxide according to the reaction:

$$Na_2SiF_6 + 4NH_3 + 2H_2O = 2NaF + 4NH_4F + SiO_2 \quad (14)$$

Thus, concentration of ammonium fluoride in the solution is increased and the solution is additionally saturated with sodium fluoride. Then the process is continued according to the above-described layout, beginning with the delivery of said solution into the settlers 19 and filter 21 for separating the precipitate of silicon dioxide.

For better understanding of the invention, it is described below by way of examples:

EXAMPLE 1

30000 Parts of waste gas by weight contain 48 parts by weight of hydrogen fluoride, 4 parts by weight of silicon tetrafluoride and 24 parts by weight of phosphate ore dust. The hydrogen fluoride and silicon tetrafluoride contained in said gas are absorbed by 2910 parts by weight of a water solution containing 115 parts by weight of ammonium carbonate, ammonium bicarbonate and ammonia expressed in terms of ammonium carbonate. Besides, the solution contains 8 parts by weight of ammonium fluoride and 116 parts by weight of sodium fluoride.

The weight proportion of sodium fluoride to the ammonium compounds and ammonia in said solution is 1 : 1.

The process of absorption produces 2930 parts by weight of the water solution which contains 97 parts by weight of ammonium fluoride, 113 parts by weight of sodium fluoride and 3 parts by weight of unreacted ammonium carbonate.

The obtained precipitate contains 6 parts by weight of sodium fluosilicate mixed with 24 parts by weight of phosphate ore dust. This precipitate is removed from the process by settling and filtering.

The obtained clarified solution is mixed with 128 parts by weight of sodium carbonate and stirred for 45 min. The resultant composition of the solution is 118 parts by weight of ammonium carbonate and 103 parts by weight of sodium fluoride of which 3 parts by weight remain in the solution which previously contained 113 parts by weight of sodium fluoride. Thus, 116 parts by weight of sodium fluoride saturate the solution completely whereas the remaining 100 parts by weight are precipitated from the saturated solution.

The precipitate of sodium fluoride is settled, filtered, washed and dried after which it is ready for use as a commercial product.

2910 parts by weight of filtrate containing 115 parts by weight of ammonium carbonate and 8 unreacted parts by weight of ammonium fluoride as well as 116 parts by weight of sodium fluoride are returned to the stage of absorption of waste gases.

The composition of the finished product, in percent, is as follows:

NaF - 97; $Na_2SiF_6$ - 0.8; $MgF_2$ - 0.3; $CA_5F(PO_4)_3$ - 1.2; $SiO_2$ - 0.4; $H_2O$ - 0.3.

EXAMPLE 2

8100 parts by weight of waste gas contain 20 parts by weight of hydrogen fluoride, 38 parts by weight of silicon tetrafluoride and 0.5 parts by weight of phosphoric acid mist.

The hydrogen fluoride and silicon tetrafluoride contained in said gas are absorbed by 1100 parts by weight of a water solution containing 52 parts by weight of ammonium carbonate, ammonium bicarbonate and ammonia expressed in terms of ammonium carbonate, as well as 5 parts by weight of ammonium fluoride and 36 parts by weight of sodium fluoride. The weight proportion of sodium fluoride to ammonium compounds and ammonia in said solution is 1 : 1.6.

After absorption the solution contains 42 parts by weight of ammonium fluoride, 3 parts by weight of unreacted ammonium carbonate and 5 parts by weight of sodium fluoride, 1 part by weight of disubstituted ammonium phosphate and 70 parts by weight of suspended precipitate of sodium fluosilicate.

This suspension is delivered into the reaction vessel together with a water solution of ammonia consisting of 100 parts by weight of water and 26 parts by weight of ammonia. The contents of the reaction vessel are stirred for an hour at 60°C. This forms ammonium fluoride and sodium fluoride in the solution, the silicon dioxide being separated as a precipitate.

This produces 1180 parts by weight of a water solution which contains 97 parts by weight of ammonium fluoride, 36 parts by weight of sodium fluoride, 1 part by weight of disubstituted ammonium phosphate, 4 parts by weight of ammonium carbonate and 23 parts by weight of precipitated silicon dioxide.

At the following stage the precipitate of silicon dioxide is settled, filtered and removed from the technological process. 60 parts by weight of water, 5 parts by weight of ammonium fluoride and 3 parts by weight of sodium fluoride are removed together with 21 parts by weight of silica gel.

Then 1120 parts by weight of the clarified solution containing 92 parts by weight of ammonium fluoride, 33 parts by weight of sodium fluoride, 4 parts by weight of ammonium carbonate, 1 part by weight of disubstituted ammonium phosphate and 2 parts by weight of silicon dioxide, are mixed with 126 parts by weight of sodium carbonate and stirred for 45 min. 95 parts by weight of sodium fluoride are precipitated.

The total losses of ammonium carbonate at all the stages of the process amount to 65 parts by weight.

The precipitate of sodium fluoride is settled, filtered and dried.

1100 parts by weight of the clarified solution containing 52 parts by weight of ammonium carbonate, 5 parts by weight parts of ammonium fluoride and 36 parts by weight of sodium fluoride are reused for absorption of waste gases.

The finished product contains (wt.-%):
$NaF$ - 9.5; $Na_2SiF_6$ - 1.7; $SiO_2$ - 1.8; $Na_2HPO_4$ - 1.0 and $H_2O$ - 0.5

EXAMPLE 3

332,000 parts by weight of waste gases include 51 parts by weight of hydrogen fluoride, 1 part by weight of silicon tetrafluoride and 42 parts by weight of sulfur dioxide. The hydrogen fluoride and silicon tetrafluoride are absorbed from said gas by 3100 parts by weight of a water solution including 96 parts by weight of ammonium carbonate, 48 parts by weight of ammonium bicarbonate, 5 parts by weight of ammonium fluoride, 4 parts by weight of ammonia, 8 parts by weight of sodium sulfite and 105 parts by weight of sodium fluoride.

The weight proportion of sodium fluoride to ammonium compounds and ammonia in said solution is 1 : 5.

The process of absorption produces 3150 parts by weight of a water solution which includes 99 parts by weight of ammonium fluoride, 2 parts by weight of ammonium carbonate, 62 parts by weight of monosubstituted ammonium sulfite, 8 parts by weight of sodium sulfite, 104 parts by weight of sodium fluoride and 1 part by weight of suspended sodium fluosilicate. Besides, 12 parts by weight of sulfur dioxide are lost in the process of absorption.

This solution is mixed with 200 parts by weight of sodium carbonate and stirred for 45 min.

This produces 94 parts by weight of ammonium carbonate, 48 parts by weight of ammonium bicarbonate, 78 parts by weight of sodium sulfite and 106 parts by weight of precipitated sodium fluoride.

The obtained suspension is settled and filtered. 3100 parts by weight of filtrate which contains 96 parts by weight of ammonium carbonate, 48 parts by weight of ammonium bicarbonate, 5 parts by weight of ammonium fluoride, 8 parts by weight of sodium sulfite and 105 parts by weight of sodium fluoride are used for absorption.

After filtration, the precipitate contains 106 parts by weight of sodium fluoride, 70 parts by weight of sodium sulfite, 1 parts by weight of sodium fluosilicate and 50 parts by weight of moisture. The moist precipitate is washed with 100 parts by weight of water heated to 70°C. The washing water containing 11 parts by weight of sodium fluoride, 66 parts by weight of sodium sulfite and 0.5 parts by weight of sodium fluosilicate is removed from the process.

The washed precipitate is dried thus obtaining a commercial product of the following composition (wt.-%):
$NaF$ - 95.0; $Na_2SO_3$ - 4.0; $Na_2SiF_6$ - 0.5; insoluble residue 0.5.

EXAMPLE 4

65000 parts by weight of waste gases contain 54 parts by weight of hydrogen fluoride and 15 parts by weight of silicon tetrafluoride. These compounds are absorbed by 6000 parts by weight of a water solution containing ammonium carbonate, ammonium bicarbonate and 132 parts by weight of ammonia expressed in terms of ammonium carbonate. Besides, the solution contains 350 parts by weight of ammonium chloride and 190 parts by weight of sodium fluoride.

The weight proportion of sodium fluoride to ammonium compounds and ammonia is 1 : 2.5.

The process of absorption produces 6020 parts by weight of a solution containing 450 parts by weight of ammonium fluoride, 178 parts by weight of sodium fluoride and 31 parts by weight of sodium fluosilicate out of which 27 parts by weight of sodium fluosilicate are precipitated. The precipitate is settled then filtered and dried. After drying, 27 parts by weight of sodium fluosilicate with 2 parts by weight of sodium fluoride are used as commercial product. The clarified solution is mixed with 143 parts by weight of sodium carbonate and stirred for 45 min. This produces 130 parts by weight of ammonium carbonate in the solution. Simultaneously, in the course of interaction of ammonium fluoride with sodium carbonate, 99 parts by weight of sodium fluoride are precipitated. After filtration and drying this precipitate can also be used as commercial product.

The composition of this product (wt.-%) is as follows:
$NaF$ - 98; $Na_2SiF_4$ - 1; $SiO_2$ - 0.5; $H_2O$ - 0.5.

The received 6000 parts by weight of the clarified solution containing 130 parts by weight of ammonium carbonate, 350 parts by weight of ammonium fluoride and 190 parts by weight of sodium fluoride are delivered for absorption.

We claim:

1. Method of processing of a waste gas containing hydrogen fluoride and silicon tetrafluoride which comprises absorbing said hydrogen fluoride and silicon tetrafluoride from said waste gas by an aqueous solution containing at least one ammonium compound selected from the group consisting of ammonium carbonate, ammonium bicarbonate and ammonium fluoride and also containing ammonia and sodium fluoride, thereby forming an aqueous solution containing ammonium fluoride and a precipitate of sodium fluosilicate, treating said solution with sodium carbonate to form a precipitate of sodium fluoride, and separating the thus formed sodium fluoride and other precipitates from the solution, and returning the remaining solution for further absorption.

2. Method according to claim 1 wherein the weight proportion of sodium fluoride to said ammonium compound and ammonia in the aqueous absorption solution is about 1 : 1.

3. Method according to claim 1 wherein, before treating the aqueous solution containing ammonium fluoride with sodium carbonate, the precipitate of sodium fluosilicate is separated from said solution.

4. Method according to claim 1 wherein, before treating the aqueous solution containing ammonium fluoride with sodium carbonate, the precipitate of sodium fluosilicate is treated with ammmonia and the formed precipitate of silicon dioxide is separated from said solution which contains ammonium fluoride.

5. Method of processing of a waste gas containing hydrogen fluoride, silicon tetrafluoride and sulfur dioxide which comprises absorbing said hydrogen fluoride, silicon tetrafluoride and sulfur dioxide from said waste gas by an aqueous solution containing at least one ammonium compound selected from the group consisting of ammonium carbonate, ammonium bicarbonate and ammonium fluoride and also containing ammonia and sodium fluoride, thereby forming an aqueous solution containing ammonium fluoride and a precipitate of sodium fluosilicate, treating said solution with sodium carbonate to form a precipitate of sodium fluoride and separating the thus formed sodium fluoride and other precipitates from the solution and returning the remaining solution for further absorption.

6. Method according to claim 5 wherein the weight proportion of sodium fluoride to said ammonium compound and ammonia in the aqueous absorption solution is about 1 : 1.

7. Method according to claim 5 wherein, before treating the aqueous solution containing ammonium fluoride with sodium carbonate, the precipitate of sodium fluosilicate is separated from said solution.

8. Method according to claim 5 wherein, before treating the aqueous solution containing ammonium fluoride with sodium carbonate, the precipitate of sodium fluosilicate is treated with ammonia and the formed precipitate of silicon dioxide is separated from said solution which contains ammonium fluoride.

* * * * *